United States Patent Office 3,409,816
Patented Nov. 5, 1968

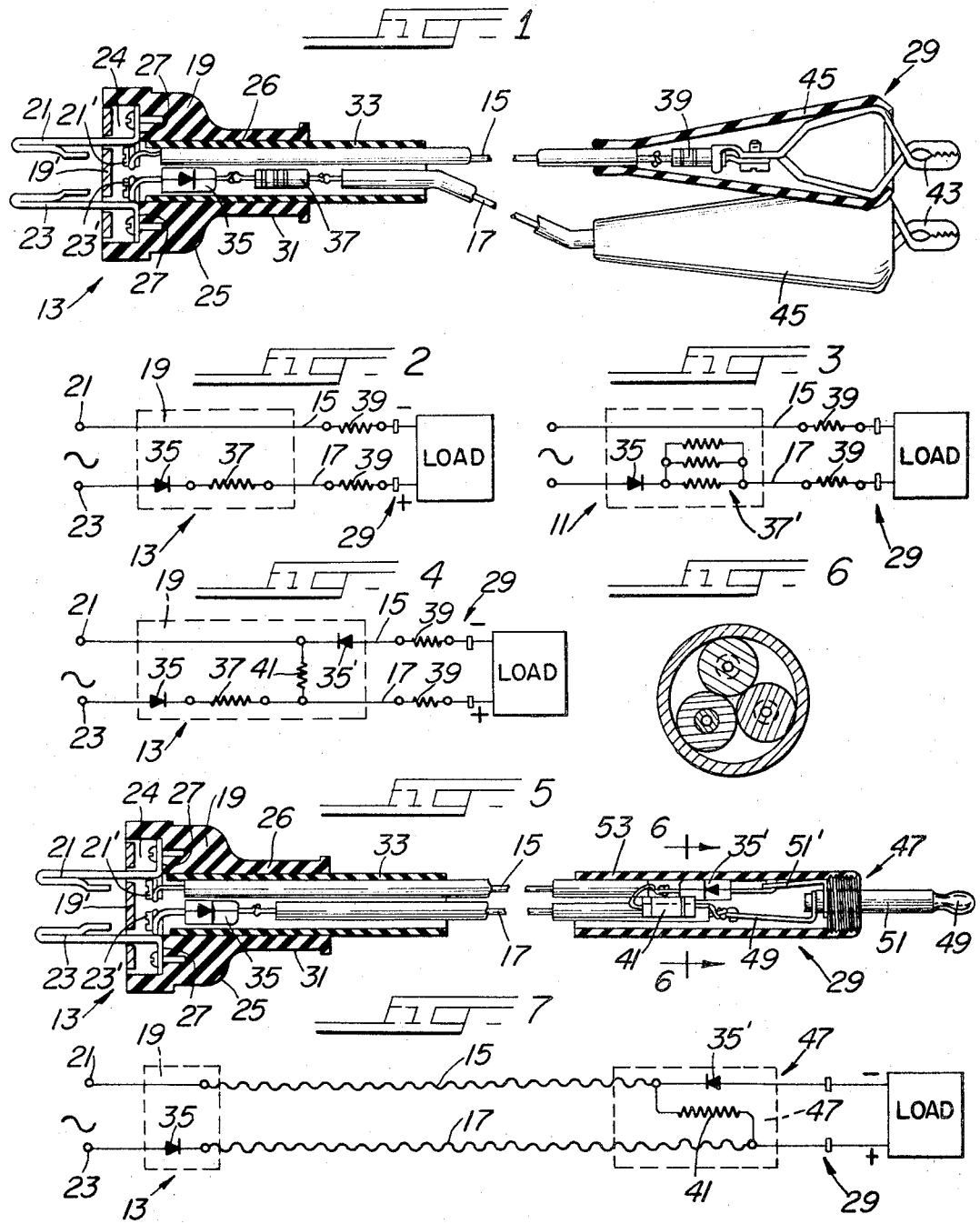

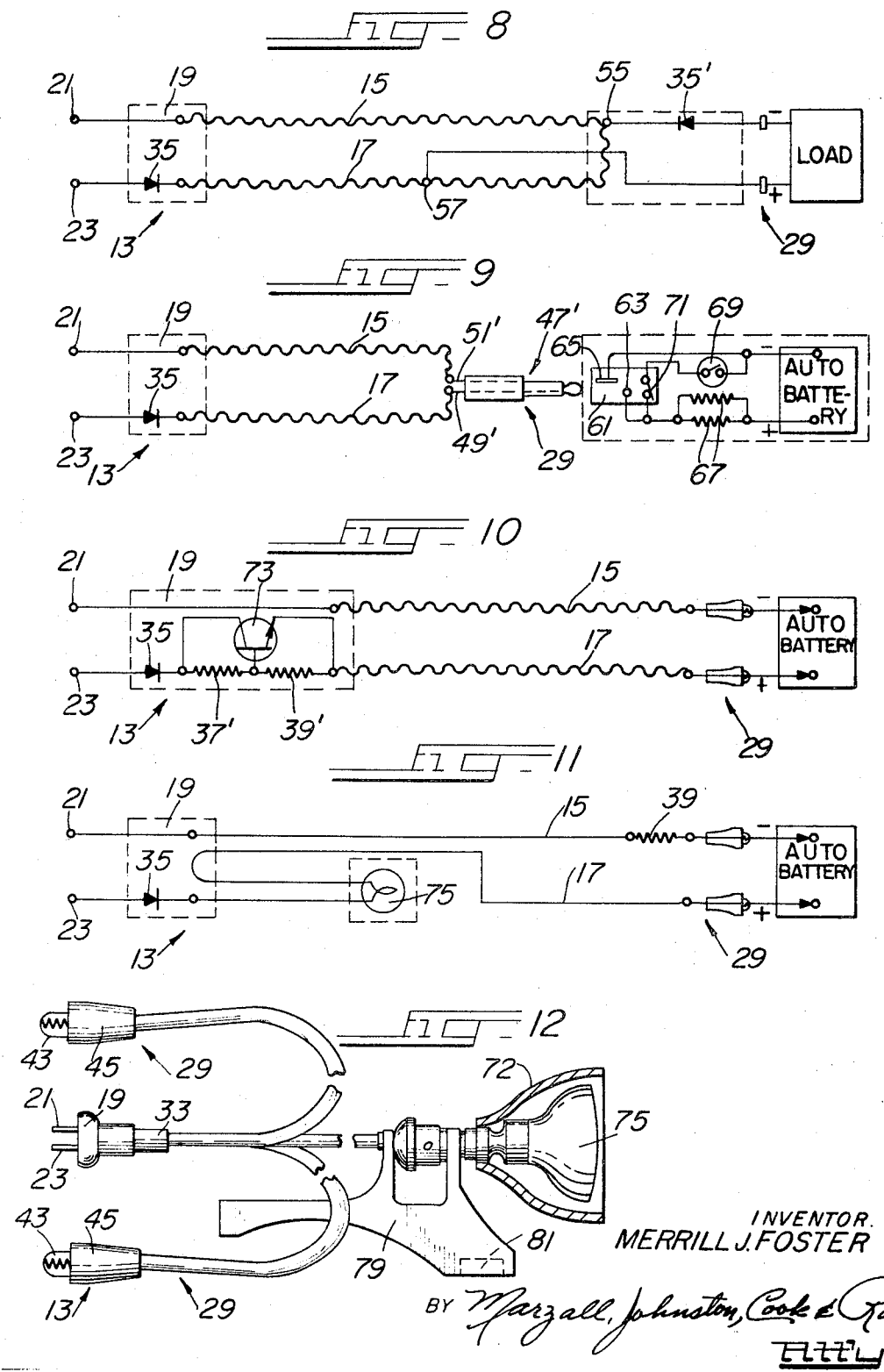

3,409,816
CONNECTOR TO CHARGE AUTOMOBILE
BATTERY
Merrill Joseph Foster, Fox River Grove, Ill., assignor to Marine Industries Inc., Barrington, Ill., a corporation of Illinois
Filed May 19, 1966, Ser. No. 551,322
2 Claims. (Cl. 320—57)

ABSTRACT OF THE DISCLOSURE

An electrical converter cord adapted to charge an automobile battery embodying at one end of the cord, an electrical plug body of insulating material showing an axial channel with a diode and a resistor in the channel. The other end of the cord has a means to connect the charging source to the battery—e.g. a jack plug adapted to charge the battery through the car headlights and which simultaneously opens the automobile headlight switch.

---

The present invention relates in general to electrical converter systems particularly adapted, when energized with AC electrical power, to deliver electrical energy in a form suitable for application on electrical batteries to charge the same, or to energize electrical devices designed to be operated by unidirectional, so-called DC electrical current.

An important object of the present invention is to provide unusually low cost and simple electrical converter means for delivering unidirectional electrical energy in response to the application, on the converter, of pulsating or fluctuating electrical energy of the kind usually called alternating current, or AC energy; a further object being to provide a converter of the character mentioned consisting of a cord or cable adapted for connection at one end with a source of AC electrical energy, such as an outlet socket of a conventional alternating current power distribution system, the cable embodying a pair of conductors incorporating one or more preferably solid state diodes and specific resistance values therein, whereby to deliver unidirectional power at desired voltage, at the AC power source remote end of the cord for application to energize a DC load, such as an electric battery or batteries to be charged or other DC load device to be powered.

Another important object is to provide a device of the character mentioned comprising a cord embodying a pair of elongated electrical conductors having a connection plug attached at one end for electrically connecting the cord in a conventional AC electric outlet socket, the conductors of the cord having electrical resistance selected to provide a desired voltage between the conductors at the plug remote end of the cord, and a diode connected in series with at least one of the conductors, as at its plug connected end; a still further object being to enclose the diode in the body of the plug, and to provide connection means at the plug remote ends of the conductors to facilitate electrical connection thereof with a load to be energized; a still further object being to provide the desired resistance in the electrical conductors of the cord by employing selected lengths of resistance wire in the cord; still a further object of the invention being to provide a battery charger of the character mentioned, including means for connecting a heat lamp element such as an infrared ray emitting lamp in series with the cord, in order to provide a combined unit adapted to charge the battery of an automotive vehicle, and simultaneously to heat vehicle engine parts, in the vicinity of the battery, for wintertime maintenance of vehicles stored in unheated parking places.

Still another important object of the invention is to provide a battery charging system of the character described adapted for connection in a vehicle mounted receptacle for cooperation with the vehicle headlight filaments serving as ballast resistance elements in charging the vehicle ignition and lighting battery.

Another important object is to provide a power supply device of the character mentioned particularly adapted to supply unidirectional electrical power at relatively low voltage, of the order of 1.5 volts, for the operation of small electrical appliances such as electric toothbrushes, pencil pointers and sharpeners and the like.

The foregoing and numerous other important objects, advantages and inherent functions of the invention will become apparent as the same is more fully understood from the following description which, taken in connection with the accompanying drawings, discloses several embodiments of the invention for the purpose of demonstrating the same.

Referring to the drawings:

FIG. 1 is a sectional view taken longitudinally through an electrical power converter cord embodying the present invention;

FIG. 2 is an electrical diagram of the device shown in FIG. 1;

FIG. 3 is an electrical diagram of a modified arrangement of the device shown in FIG. 1;

FIG. 4 is an electrical diagram illustrating another modification of the device shown in FIG. 1;

FIG. 5 is a sectional view taken longitudinally through a modified electrical power converter cord embodying the present invention;

FIG. 6 is an enlarged sectional view taken substantially along the line 6—6 in FIG. 5;

FIG. 7 is an electrical diagram of the device shown in FIG. 5;

FIG. 8 is an electrical diagram illustrating a modified form of the device shown in FIGS. 5 and 7;

FIG. 9 is an electrical diagram of an electrical converting system embodying the invention as applied in charging the storage battery of an automotive vehicle while using the vehicle headlamp filaments as ballast resistors;

FIG. 10 is an electrical diagram of an electrical converting system embodying the present invention;

FIG. 11 is an electrical diagram illustrating a combined auto vehicle battery charging and engine heating apparatus adapted for wintertime maintenance of vehicles parked in unheated locations; and FIG. 12 is a side view of the combined apparatus shown in FIG. 11.

To illustrate the invention the drawings show several electrical power conversion systems, each comprising an elongated cord 13 embodying a pair of conductors 15 and 17, and a connection plug 19 having a pair of prong electrodes 21, 23, adapted for connection in the outlet socket of a conventional power distribution system (not shown) whereby to apply AC energy upon the conductors of the cord at their plug connected ends. As shown, the plug 19 may comprise a formed body 25 of any suitable or preferred insulating material, said body providing a shallow open cavity 24, at one end, and a preferably axial channel 26 extending through the body from its other end and opening into the bottom of the cavity, abutments 27 being provided in the bottom of the cavity, on opposite sides of the channel, on which abutments the prong electrodes 21 and 23 are anchored. The conductors 15 and 17 of the converter cord may be electrically connected respectively at one end thereof, with the prong electrodes 21 and 23, as by clamp screws 21′ and 23′, the plug remote ends of the conductors 15 and 17 being electrically connected with any suitable, preferred or convenient coupling means 29 for electrically connecting the cord conductors with a load to be energized.

As shown, the plug body 19 may be formed with a sleeve portion 31 extending at the prong remote end of the body 19, said sleeve defining the conductor channel 26 and affording a handle by means of which the plug may be readily grasped in manipulating the same when connecting the plug in an electrical outlet. If desired, the channel 26 may be provided with a tubular lining 33 of preferably flexible insulating material which may be fitted within the channel 26 and secured in place therein as by means of cement, the sleeve member 33 having an end projecting outwardly of the prong remote end of the extension 31 of the plug body, in order to embrace and enclose the cord conductors 15 and 17 outwardly of the plug body portion 31.

A cord 13 embodying the present invention provides means for connecting a DC load with an AC power source of substantially higher voltage, and comprises voltage reducing means, as well as one-way current flow means for applying unidirectional electrical current to the load at a voltage substantially less than that applied to the cord by said AC source. To these ends, devices embodying the invention may be designed for connection with a conventional AC power source supplying electrical energy at a frequency of the order of 60 cycles and voltage of the order of 120 volts, although systems embodying the invention, of course, may be energized at other frequencies and voltages, the cord forming a power conversion circuit embodying electrical resistance between the plug and load connected ends of the conductors 15 and 17 to provide unidirectional current power, at the output end of the cord, at the voltage desired for application to the load, one or other or both of the conductors being provided with diode means arranged to permit current flow in one direction only, through the conductors 15 and 17, while preventing current flow in the opposite direction, during alternate half cycles of energy applied to the cord through the plug prongs 21, 23.

While voltage dropping resistance and one-way current flow diode means may be incorporated in the power conversion circuitry, in any suitable, preferred or convenient manner, the diode means may comprise an element or elements 35, such as the one amp No. 5A2 solid state diode produced by International Rectifier Corporation of Phoenix, Ariz.; and, as shown in all of the illustrated embodiments, a diode 35 may be electrically connected between one of the plug prongs, such as the prong 23, and one of the cord conductors, such as the conductor 17.

As shown in FIGS. 1 and 2 of the drawings, the desired resistance to be incorporated in the converter may conveniently comprise a resistance element or resistor 37 electrically connected in circuit between the transistor unit 35 and the conductor, such as the conductor 17, with which it is electrically connected. The other of the cord conductors, such as the conductor 15, may be electrically connected directly with the other of the plug prongs, such as the prong 21, and, if desired, a resistor 39 having a selected resistance value may be connected in series with each of the conductors 15 and 17, at the plug remote or output ends thereof, as adjacent the coupling means 29.

The diode element 35, as well as the resistance element 37, may be assembled and disposed entirely within the plug body 19, as in the channel 26, and the sleeve 33, if employed. It is also desirable to embed or pot the prong connected ends of the components, within the plug body 19, in an insulating compound such as epoxy resin or other preferred potting compound, which may be poured into the open cavity 24 at the prong carrying end of the body 19 to a depth covering the body mounted ends of the prongs 21 and 23, including the connection screws 21' and 23', and allowing the same to solidify in situ. If desired, a conventional cover disc 19' may be applied upon the prongs 21 and 23 in position embedded in the potting compound and covering the end of the plug body 19. The potting compound may be allowed to fill the channel 26 or the sleeve 33, where used, to any desired extent, and preferably at least to a depth sufficient to completely envelope the plug connected ends of the conductors, as well as the diode and resistor elements, in the potting compound. For mass production of cords, the plug prongs, with conductors, diode and resistor elements electrically connected thereto, as a preassembly unit may be disposed in a suitable die, and the body 25 then jet molded upon and about the components of the preassembly unit.

The converter shown in FIGS. 1 and 2 may be made to deliver unidirectional current of the order of 25 milliamperes, at a potential of the order of 54 volts, when the cord is energized by connection with a 120 volt AC power supply source, by providing resistance of the order of 2000 ohms in the circuit; and such resistance may be apportioned between the resistors 37 and 39 or may be concentrated in any of them while omitting the others entirely.

As shown in FIG. 3, a cord converter may be provided for delivering current at relatively high amperage, by providing more heat dissipation capacity in the resistance components. This may be accomplished by connecting several resistance elements 37' in parallel relationship, in place of the single element 37.

If desired, the converter may be constituted to deliver unidirectional current to a load, at relatively low voltage, by connecting a resistor 41 between the conductors 15 and 17, as indicated in FIG. 4 of the drawings, the arrangement shown being adapted to deliver unidirectional current to the load at a potential of the order of 12 volts, where the series resistance in the circuit is of the order of 4000 ohms, while the shunt resistance, that is to say, the resistor 41, has a rating of the order of 1000 ohms, the converter being energized by connection with a 120 volt AC power supply source. The potential at which unidirectional current is delivered to the load is, of course, determined by the value of shunt connected resistance. Where shunt resistance is thus employed in a converter used for battery charging purposes, a one-way current flow diode 35' should be connected in circuit, preferably in one or other or both of the conductors 15, 17, between the load connected ends of the conductors and the shunt connected resistance 41, in order to prevent the connected battery from discharging through the shunt resistor during the negative half cycle of AC power applied at the input end of the converter cord.

As shown more particularly in FIGS. 5 through 9, the series circuit resistance may be provided by forming either or both of the cord conductors 15 and 17 of high resistance conductor wire, such as No. 34 Tophet C resistance wire made by Wilbur Driver, Inc. of Newark, N.J., and rated at 34 ohms per foot, a suitable length of resistance wire being connected in circuit to obtain the desired ballast resistance in the converter cord.

As shown more particularly in FIGS. 5, 6 and 7 of the drawings, a converter cord for charging and maintaining conventional 1.5 volt batteries of the sort employed for driving small appliances such as toothbrushes, pencil pointers, power erasers, portable torches and the like, may be provided by forming the cord conductors 15 and 17 of resistance wire and connecting a shunt resistor unit 41 rated at 12 ohms between the plug remote ends of the conductors 15, 17. In such an arrangement, the conductors 15 and 17 may have length of the order of 10 feet, if made of No. 34 Tophet C resistance wire. Of course, any suitable resistance wire may be employed, including wire rated at other than 34 ohms per foot. In the embodiment shown in FIGS. 5, 6 and 7 the diode 35 is shown mounted in the plug 19, while the shunt resistor 41, together with the diode 35', if used, is assembled in the coupling means 29.

Any suitable, convenient or preferred means may be employed for connecting the output end of the converter cord with a load to be energized. For example, conventional alligator clips 43, preferably enclosed in flexible jackets 45 of insulating material, may be connected with the plug remote ends of the conductors 15 and 17, as shown in FIGS. 1 and 12; and the resistance units 39, where employed, may be electrically connected between a cord conductor and the associated alligator clip 43.

As shown in FIGS. 5, 6 and 7, however, where the converter cord is provided particularly for maintaining small appliance batteries, it is convenient to form the coupling means 29 as a conventional jack plug 47 adapted to be removably connected or coupled with a jack (not shown) that may be assembled on the appliance to be serviced, such jack being electrically connected with the batteries to be charged. The jack plug 47 may comprise a central stem having a tip 49 and a sleeve 51 concentrically enclosing the stem, the stem and sleeve being relatively insulated the one from the other and electrically connected respectively with corresponding jack plug terminals 49' and 51' to which the conductors 15 and 17 may be electrically connected. As shown, the end of the conductor 15 may be connected with the terminal 51' through the diode 35', and the diode connected end of said conductor may also be connected through the shunt resistance element 41 to the terminal 49', with which the conductor 17 is connected. The jack plug 47 may also be provided with a handle 53 comprising a sleeve adapted to be connected on the sleeve 51, in readily removable fashion, in position enclosing the diode 35', the resistor 41 and the ends of the conductors 15 and 17 with which the diode and resistor are electrically interconnected. If desired, the jack plug mounted components may be embedded in a potting compound or jet molded in the manner previously described, in connection with the plug 19.

The arrangement shown in FIG. 8 of the drawings comprises a voltage divider wherein the conductors 15 and 17 have length of the order of 50 feet providing resistance of the order of 40 ohms in each conductor, the conductors being connected together electrically, as at the junction 55, at their ends remote from the plug 19. One side of the load may be connected through a diode 35' with the interconnected ends of the conductors, at the junction 55, the other side of the load being connected with one of the conductors, such as the conductor 17, at a connection junction 57 therein, midway between the plug mounted diode 35 and the conductor junction 55. Such an arrangement when energized by connection with a 120 volt AC power source will apply unidirectional current of the order of a half ampere at an electrical potential of the order of 13.5 volts, being thereby suitable for maintaining the charge in a conventional 12 volt storage battery.

As shown in FIG. 9, the conductors 15 and 17, which may comprise suitable lengths of high resistance wire providing resistance of the order of 6 ohms, in each conductor, may be connected at their ends, remote from the plug 19, respectively with the terminals 49' and 51' of a jack plug 47', similar to the previously described jack plug 47, such arrangement being adapted to deliver unidirectional current of the order of 5 amperes to maintain the charge in a 12 volt storage battery disposed in operating position in an automotive vehicle 59. To that end, a jack 61 may be mounted in readily accessible position in the vehicle 59 to detachably receive the plug 47', such jack incorporating electrical contacts 63 and 65 respectively adapted to electrically connect with the tip and sleeve of the jack plug, when the same is in mounted position in the jack. One of the jack electrodes, such as the electrode 65, may be connected with one side, such as the grounded side of the battery, the other jack contact 63 being electrically connected with the ungrounded side of the battery through the filaments 67 of the vehicle headlights. The jack contacts 63 and 65 thus are electrically connected with the opposite sides of the vehicle headlight control switch 69. Consequently, the most convenient location for the jack in an automotive vehicle is immediately adjacent the light switch 69 which, of course, should remain open whenever and so long as the converter is connected for battery charging purposes, to avoid short circuiting the output end of the converter cord. To this end, it may be desirable to incorporate in the jack a normally closed switch 71 adapted to be held open whenever and so long as the plug 47' is mounted in operative position in the jack 61. Such normally closed switch may be connected in series with the light switch 69 and the vehicle headlight filaments 67.

The arrangement shown in FIG. 10 of the drawings provides a battery charger and power supply adapted, when energized by connection with a 120 volt AC supply source, to deliver unidirectional current of the order of 5 amperes, at a desired potential at the output end of the converter cord. This is accomplished by electrically connecting an NPN transistor 73 and a pair of resistors 37' and 39' in one of the cord conductors, such as the conductor 17, said NPN transistor and resistors being preferably mounted in the plug 19 adjacent the diode 35. The resistor 37' may have a rating of the order of 1000 ohms and may be connected in series between the diode 35 and the base of the transistor 73. The resistor 39' may have a rating of the order of 20 ohms and may be electrically connected between the base of the transistor 73 and the cord conductor 17, the collector and emitter of the transistor 73 being connected respectively with the base remote ends of the resistors 37' and 39'. The diode 35 serves to block transmission of the negative half cycles of energy supplied from the AC power source, while the NPN transistor functions to clip off and thus block transmission of the base portions of the remaining or rectified pulsations of the wave. As a consequence, the tip portions only of the rectified wave pulses are transmitted to the output end of the cord, thereby reducing the output voltage to the desired low value, which is determined by the relative resistance values of the resistance elements 37' and 39'. Ballast resistance of the order of 10 ohms should be included in the conductors 15 and 17.

A useful embodiment of the invention is illustrated in FIGS. 11 and 12, wherein a preferably 250 watt infrared ray heating lamp 75 is interconnected in series in one of the conductors, such as the conductor 17, of the converter cord, said lamp being preferably mounted with a directional reflector 77, in a mounting bracket 79 having an attaching magnet 81 fixed in the bracket so that the same may be conveniently secured on the engine block of an automotive vehicle, the resistance of the lamp 75 being such as to produce unidirectional current of the order of 1 ampere at a potential of the order of 13.6 volts at the output end of the cord for automotive storage battery charging purposes. The arrangement shown in FIGS. 11 and 12 thus not only provides for charging a vehicle battery but also for warming that portion of the vehicle engine upon which the infrared rays of the lamp 75 are directed.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of demonstrating the invention.

The invention is hereby claimed as follows:

1. An electrical converter in combination with a vehicle having an electric storage battery, incandescent filament lamps and a lamp switch interconnected in a series circuit, said converter comprising a cord embodying a pair of conductors, a connection plug having terminals for connection in an electrical power outlet, said terminals being electrically connected with said conductors at one end of the cord, to form the power input end of the cord, coupling means electrically connected with said conductors at the plug remote end of the cord, to form the power output end of the cord and to provide for attaching the conductors with an electrical load, said conductors providing an electrical translation circuit embodying voltage dropping resistance, and a one-way current flow diode interconnected in series with at least one of said conductors between a said plug terminal and said coupling means; said coupling means serving to electrically connect said conductors in said series circuit on opposite sides of said lamp switch, and means for disabling said series circuit between said switch and said filament lamps while said conductors are connected therewith.

2. An electrical converter comprising a cord embodying a pair of conductors, a connection plug having terminals for connection in an electrical power outlet, said terminals being electrically connected with said conductors at one end of the cord, to form the power input end of the cord, coupling means electrically connected with said conductors at the plug remote end of the cord, to form the power output end of the cord and to provide for attaching the conductors with an electrical load, said conductors providing an electrical translation circuit embodying voltage dropping resistance, and a one-way current flow diode interconnected in series with at least one of said conductors between a said plug terminal and said coupling means, said connection plug being a body of insulating material formed with an axial channel therethrough, the plug terminals being secured to said body on opposite sides and at one end of said channel, said diode being disposed in the channel and having its opposite sides respectively connected electrically with one of said terminals and with an end of one of said conductors, an end of the other of said conductors being electrically connected with the other of said terminals, and a resistor having a finite resistance disposed within the axial channel between and electrically connected with the diode and the diode connected end of the conductor.

References Cited

UNITED STATES PATENTS

| | | | |
|---|---|---|---|
| 1,610,205 | 12/1926 | Fritts | 320—59 X |
| 2,540,841 | 2/1951 | Stancu | 320—59 X |
| 3,123,759 | 3/1964 | Grey | 320—40 |
| 3,201,617 | 8/1965 | Pacoroni et al. | 307—146 |
| 3,217,227 | 11/1965 | Sherwood | 320—57 X |
| 3,264,545 | 8/1966 | Kott | 320—2 X |
| 3,270,267 | 8/1966 | Nolte | 320—56 |
| 3,329,881 | 7/1967 | Tolmie | 320—2 |

FOREIGN PATENTS

| | | |
|---|---|---|
| 827,759 | 2/1960 | Great Britain. |

JOHN F. COUCH, *Primary Examiner.*

S. WEINBERG, *Assistant Examiner.*

UNITED STATES PATENT OFFICE
CERTIFICATE OF CORRECTION

Patent No. 3,409,816                                                          November 5, 1968

Merrill Joseph Foster

It is certified that error appears in the above identified patent and that said Letters Patent are hereby corrected as shown below:

In the drawing, sheets 1 and 2, and in the heading to the printed specification, title of invention, "CONNECTOR TO CHARGE AUTOMOBILE BATTERY", each occurrence, should read -- BATTERY CHARGER --.

Signed and sealed this 10th day of March 1970.

(SEAL)
Attest:

Edward M. Fletcher, Jr.                                  WILLIAM E. SCHUYLER, JR.
Attesting Officer                                                    Commissioner of Patents